US006997718B1

(12) United States Patent
Boettcher et al.

(10) Patent No.: US 6,997,718 B1
(45) Date of Patent: Feb. 14, 2006

(54) INFANT SIMULATOR WITH FLOPPY NECK ASSEMBLY HAVING A FULL RANGE OF MOTION

(75) Inventors: Timmothy Allen Boettcher, Eau Claire, WI (US); Jeremiah R. Bauer, Mondovi, WI (US); Shane Edward Mooney, Eau Claire, WI (US); Joel Brian Roberts, Eau Claire, WI (US); Michael John Zaborowski, Eau Claire, WI (US)

(73) Assignee: Realityworks, Inc., Eau Claire, WI (US)

( * ) Notice: Subject to any disclaimer, the term of this patent is extended or adjusted under 35 U.S.C. 154(b) by 243 days.

(21) Appl. No.: 10/464,088

(22) Filed: Jun. 18, 2003

(51) Int. Cl.
G09B 23/28 (2006.01)
A63H 3/36 (2006.01)

(52) U.S. Cl. .................. 434/262; 434/238; 434/270; 446/297; 446/391

(58) Field of Classification Search ............... 446/300, 446/298, 391, 376, 295, 296, 484, 384, 338; 434/270, 267, 239; 73/866.4
See application file for complete search history.

(56) References Cited

U.S. PATENT DOCUMENTS

| 1,372,351 | A | * | 3/1921 | Hurlstone-Jones .......... 446/297 |
| 3,303,605 | A | | 2/1967 | Henry |
| 3,319,376 | A | | 5/1967 | Doppelt et al. |
| 3,685,200 | A | | 8/1972 | Noll |
| 3,740,871 | A | | 6/1973 | Berton et al. |
| 3,866,350 | A | | 2/1975 | Goldfarb et al. |
| 3,916,535 | A | * | 11/1975 | Hewson ...................... 434/265 |
| 3,918,199 | A | | 11/1975 | De Masi |
| 4,003,157 | A | | 1/1977 | Guerrero |
| 4,115,948 | A | | 9/1978 | Burks |
| 4,190,982 | A | | 3/1980 | Rahmstorf |
| 4,245,429 | A | | 1/1981 | Katzman et al. |
| 4,249,338 | A | | 2/1981 | Wexler |
| 4,268,991 | A | * | 5/1981 | Cotey et al. ................ 446/373 |
| 4,395,235 | A | | 7/1983 | Becker |
| 4,530,671 | A | | 7/1985 | Mednick et al. |
| 4,575,351 | A | | 3/1986 | Gonzalez |
| 4,762,494 | A | | 8/1988 | Woods |
| 4,773,865 | A | | 9/1988 | Baldwin |
| 4,820,236 | A | | 4/1989 | Berliner et al. |
| 5,052,969 | A | | 10/1991 | Smith |
| 5,096,424 | A | | 3/1992 | Carlberg |
| 5,232,369 | A | | 8/1993 | Mavrikis |
| 5,236,385 | A | | 8/1993 | May |

(Continued)

FOREIGN PATENT DOCUMENTS

DE    43 08 493 A1    9/1994

(Continued)

*Primary Examiner*—Derris H. Banks
*Assistant Examiner*—Dmitry Suhol
(74) *Attorney, Agent, or Firm*—Sherrill Law Offices, PLLC

(57) ABSTRACT

An infant simulator with a neck linkage connecting the head to the torso which includes at least (a) a longitudinally extending central shaft fixedly attached to the torso proximate the lower end of the central shaft, (b) a socket fixedly attached to the head, (c) a ball fixedly attached to the central shaft and pivotally captured within the socket for permitting pivoting of the socket relative to the central shaft as between a longitudinally aligned central rest position and a longitudinally angled position, and (d) preferably a spring coaxially positioned around the central shaft and captured between the socket and the upper end of the central shaft, whereby the spring biases the socket into the longitudinally aligned central rest position.

81 Claims, 9 Drawing Sheets

U.S. PATENT DOCUMENTS

| | | |
|---|---|---|
| 5,314,339 A | 5/1994 | Aponte |
| 5,356,295 A | 10/1994 | Grosz |
| 5,443,388 A | 8/1995 | Jurmain et al. |
| 5,509,810 A | 4/1996 | Schertz et al. |
| 5,540,592 A | 7/1996 | Scheinberg et al. |
| 5,853,292 A | 12/1998 | Eggert et al. |
| 5,941,757 A | 8/1999 | Jurmain et al. |
| 6,022,263 A * | 2/2000 | Liu et al. .................. 446/379 |
| 6,050,826 A | 4/2000 | Christianson et al. |
| RE36,776 E | 7/2000 | Jurmain et al. |
| 6,089,873 A | 7/2000 | Jurmain et al. |
| 6,238,215 B1 | 5/2001 | Jurmain et al. |
| 6,428,321 B1 | 8/2002 | Jurmain et al. |
| 6,454,571 B1 | 9/2002 | Jurmain et al. |
| 6,511,359 B1 * | 1/2003 | Lui ........................... 446/321 |
| 6,537,074 B1 | 3/2003 | Jurmain et al. |
| 6,749,433 B1 * | 6/2004 | Kassai et al. ............... 434/267 |
| 2002/0022212 A1 | 2/2002 | Christianson et al. |
| 2003/0044758 A1 | 3/2003 | Ray |
| 2004/0116042 A1 * | 6/2004 | Emoff ....................... 446/384 |

FOREIGN PATENT DOCUMENTS

| | | |
|---|---|---|
| EP | 0 044 642 | 1/1982 |
| EP | 0 472 365 | 2/1992 |
| GB | 1 540 078 | 2/1979 |
| GB | 2 068 753 | 8/1981 |
| GB | 2279886 A * | 1/1995 |

* cited by examiner

INFANT SIMULATOR WITH FLOPPY NECK ASSEMBLY HAVING A FULL RANGE OF MOTION

FIELD OF INVENTION

The invention relates to infant simulators used in educational programs for educating prospective parents about the realities of parenthood, assisting in the education and training of personnel entering the child-care profession, and assisting in the continuing education of persons working in the child-care profession.

BACKGROUND

Teen-age pregnancy is an ever increasing problem. Teen-age parents, surveyed as to why they elected to have a baby, gave such reasons as "babies are so cute," "I wanted attention," and "I needed someone to love and love me back." Such idealistic feelings toward having a baby almost never include an understanding of the responsibilities imposed by a baby, including loss of sleep, loss of freedom, the need for constant attention, etc. Attempts to educate teen-agers about the trials and tribulations of caring for an infant and raising a child using the traditional educational methods of lecture and readings, are rarely successful.

Some resourceful educators, realizing that traditional educational methods are inadequate, have attempted to demonstrate the care requirements of an infant by requiring students to carry a sack of flour, an egg or a plant for several days. While somewhat exemplary of the care requirements of an infant, such programs do not fairly represent the care requirements of an actual infant and have proven to be of limited success.

Interactive infant simulator systems for use in educating students about the care requirements of an infant are described in U.S. Pat. Nos. 5,443,388, 6,428,321, and 6,454,571. The infant simulators periodically generates a demand signal (e.g., a cry) throughout an assignment period on a schedule unknown to the student, with the student required to provide timely and appropriate care to the infant simulator (e.g., insert a key or change a diaper) in response to the cry.

It is well known and understood by those who have cared for an infant that it is absolutely necessary to continuously support the head of the infant whenever the infant is held. Infants are simply incapable of supporting their own head in an upright position for several months after birth. Failure to support the head when handling an infant can result in serious injury caused by flopping of the head.

A number of dolls have been designed with floppy necks, including the psychotherapy doll disclosed in U.S. Pat. No. 4,762,494 issued to Woods and the training doll disclosed in U.S. Pat. No. 4,575,351 issued to Gonzalez. However, neither of these dolls provide a realistic bending of the neck, (e.g., the neck of the doll disclosed in Gonzalez is simply pinched by a sew line to permit flopping of the head), nor do they include instrumentation to monitor and record undesirable flopping of the head.

Interactive infant simulator systems with a neck linkage allowing realistic rearward flopping of the head relative to the torso is described in U.S. Pat. Nos. 5,941,757, 6,089,873, and 6,238,215. The disclosed infant simulators include a head floppily connected to a torso by a neck linkage which allows free rearward repositioning of the head relative to the torso as between an acceptable contented position and an unacceptable, harmful, rearwardly bent position. The infant simulator includes a head-position sensing unit for sensing the flopped position of the head relative to the torso as between the acceptable and unacceptable positions and at least one of (i) a data recording unit for recording a sensed positioning of the head in an unacceptable position for subsequent review, and (ii) a signal generating unit for generating a perceptible distress signal (e.g., a cry or scream) when the head is sensed in an unacceptable position.

While the infant simulator systems described in U.S. Pat. Nos. 5,941,757, 6,089,873, and 6,238,215 constitute a significant advance in infant simulators, a continuing need exists for improved infant simulators that realistically demonstrate the head support required by infants, and preferably include a system for monitoring, signaling and reporting flopping of the head as between acceptable and unacceptable positions so as to enhance the value of the infant simulator for use in educational programs for educating prospective parents about the realities of parenthood, assisting in the education and training of personnel entering the child-care profession, and assisting in the continuing education of persons working in the child-care profession.

SUMMARY OF THE INVENTION

The infant simulator of the present invention is a doll equipped with a realistically floppy neck. The infant simulator preferably includes a means for sensing and recording and/or reporting instances in which the head has not been properly supported during handling and thereby allowed to flop into an unacceptable position.

In a first aspect, the infant simulator comprises (i) a doll having at least a torso and a head connected to the torso by a neck linkage, wherein (A) the head defines a longitudinal primary axis, (B) the longitudinal primary axis defined by the head defines a longitudinal resting axis relative to the torso when the head is in a central rest position, and (C) the neck linkage allows gravitational tilting of the head in any direction from the longitudinal resting axis as between the rest position and a bent position, (ii) a means effective for sensing positioning of the head in the bent position, and (iii) one or both of (A) a data recording means in communication with the head-position sensing means effective for recording a sensed positioning of the head in the bent position as bent-neck occurrence data, and (B) a means in communication with the head-position sensing means for generating a perceptible distress signal when the head is sensed in the bent position.

A specific embodiment of the first aspect of the infant simulator comprises a neck linkage which includes at least (i) a longitudinally extending central shaft having an upper end and a lower end, defining a primary longitudinal axis, and fixedly attached to the torso proximate the lower end of the central shaft, (ii) a socket fixedly attached to the head, and (iii) a ball fixedly attached to the central shaft and pivotally captured within the socket for permitting pivoting of the socket relative to the central shaft as between a longitudinally aligned central rest position and a longitudinally angled position.

A specific embodiment of the means effective for sensing positioning of the head in the bent position useful with the first aspect of the infant simulator is a switch attached to the neck linkage which is electrically open when the socket is in the central rest position and electrically closed when the socket is in a longitudinally angled position.

In a second aspect, the infant simulator comprises a doll having at least a torso and a head connected to the torso by a neck linkage. The head is biased into a rest position relative to the torso by a biasing means and defines a longitudinal primary axis. The longitudinal primary axis defined by the head defines a longitudinal resting axis relative to the torso when the head is in the rest position. The neck linkage allows gravitational tilting of the head in any direction from the longitudinal resting axis as between the rest position and a bent position.

The second aspect of the infant simulator preferably further comprises (i) a means effective for sensing positioning of the head in the bent position, and one or both of (ii) a data recording means in communication with the head-position sensing means effective for recording a sensed positioning of the head in the bent position as bent-neck occurrence data, and (iii) a means in communication with the head-position sensing means for generating a perceptible distress signal when the head is sensed in the bent position.

A specific embodiment of the second aspect of the infant simulator comprises a neck linkage which includes at least (i) a longitudinally extending central shaft fixedly attached to the torso proximate the lower end of the central shaft, (ii) a socket fixedly attached to the head, (iii) a ball fixedly attached to the central shaft and pivotally captured within the socket for permitting pivoting of the socket relative to the central shaft as between a longitudinally aligned central rest position and a longitudinally angled position, and (iv) a spring coaxially positioned around the central shaft and captured between the socket and the upper end of the central shaft, whereby the spring biases the socket into the longitudinally aligned central rest position.

The specific embodiment of the second aspect of the infant simulator preferably further comprises (i) a switch attached to the neck linkage wherein the switch is electrically open when the socket is in the central rest position and electrically closed when the socket is in a longitudinally angled position, and one or both of (ii) a data recording means in electrical communication with the switch for recording an electrical closing of the switch as bent-neck occurrence data, and (iii) a sound generating means in electrical communication with the switch for generating a perceptible distress signal when the switch is electrically closed.

In a third aspect, the infant simulator comprises a doll having at least a torso and a head connected to the torso by a neck linkage. The head is biased into a forward-facing rest position atop the torso by a biasing means and defines a longitudinal primary axis. The neck linkage allows rotation of the head about the longitudinal primary axis in both (i) a clockwise direction from the forward-facing rest position towards a right-facing position, and (ii) a counterclockwise direction from the forward-facing rest position towards a left-facing position.

A specific embodiment of the third aspect of the infant simulator comprises a neck linkage wherein the head is biased into a forward-facing rest position atop the torso by a spring and first and second components, with one of the components fixedly attached to the torso and the other component fixedly attached to the head. The first component has a V-shaped surface defining a central nadir and a pair of ramped legs. The second component is biased by the spring against the V-shaped surface so as to bias the second component to rest within the nadir of the V-shaped surface when the head is in the forward-facing rest position. The second component is effective for traveling along a ramped leg of the V-shaped surface when the head is rotated about the longitudinal primary axis.

DETAILED DESCRIPTION OF A PREFERRED EMBODIMENT

Definitions

Figure 1:
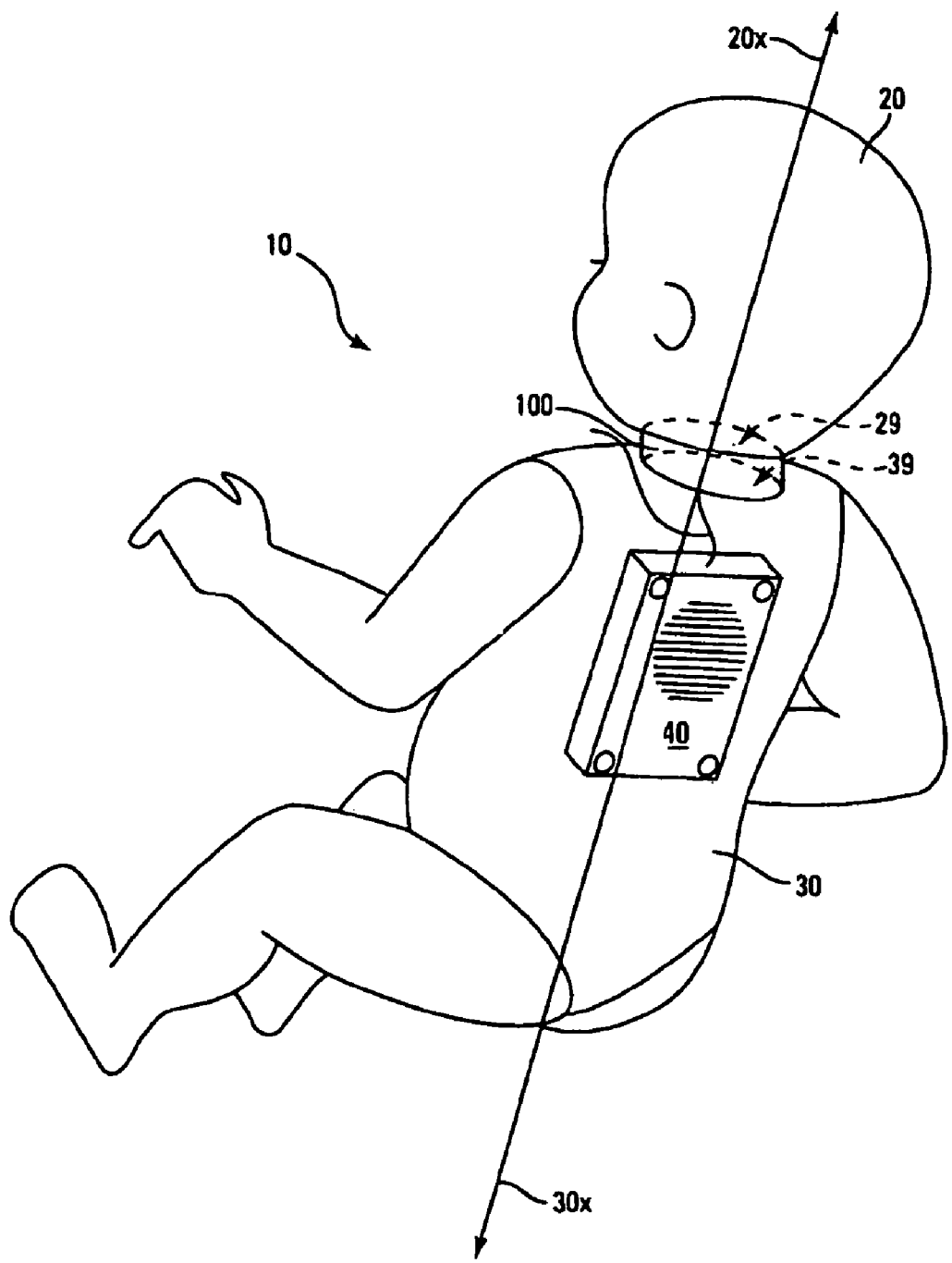
FIG. 1 is a perspective view of one embodiment of the invention with the head in the central rest position.

As utilized herein, including the claims, the phrase "assignment period," means the period of time during which the infant simulator is activated and the assigned person or team is given custody of the infant simulator (e.g., overnight, 48 hours, one week).

As utilized herein, including the claims, the term "doll" means a figure representative of a human being and including at least a portion representing a head and a portion representing a torso. The figure is preferably shaped as an infant and includes arms and legs. Other physical features can be represented as desired, including specifically, but not exclusively, hair, eyes, eye lashes, eyebrows, ears, nose, mouth, hands, fingers, fingernails, areolae, bellybutton, genitalia, feet, toes, toenails, skin pigmentation, and physical deformities.

As utilized herein, including the claims, the phrase "distress period," when used in connection with the generation of a distress signal, means a time period of predetermined duration or bounded random duration beginning immediately or shortly after sensing of an unacceptable positioning of the head.

As utilized herein, including the claims, the term "infant" refers to a young human being ranging in age from a newborn, including a premature newborn, to an approximately one-year old child.

As utilized herein, including the claims, the phrase "longitudinal primary axis", when used to reference an axis through the head of the infant simulator, refers to an axis extending through the center of gravity of the head and the center of the area bounded by the periphery line of attachment of the head to the torso.

As utilized herein, including the claims, the phrase "perceptible signal" means any and all means of communication capable of conveying notice or warning to a person, including specifically, but not exclusively audible signals (e.g., crying), olfactory signals (e.g., emission of odorous gas), tactile signals (e.g., wet diaper), visual signals (e.g., gesture), and multimedia signals (e.g., crying and tears).

As utilized herein, including the claims, the term "position," includes both the singular and the plural form, such that sensing a "position" includes both sensing a specific singular position, sensing specific multiple positions or sensing a position within a defined range of positions.

Nomenclature

10 Infant Simulator or Doll
20 Head
20x Longitudinal Primary Axis defined by the Head
29 Neck Opening in Head
30 Torso
30x Longitudinal Resting Axis
39 Neck Opening in Torso
40 Central Microcontroller Unit
50 Switch
51 First Electrical Contact
52 Second Electrical Contact
100 Neck Linkage
110 Central Shaft
110x Longitudinal Primary Axis defined by Central Shaft
110a Upper End of Central Shaft
110b Lower End of Central Shaft
111 First Transverse Bore through the Central Shaft
112 Second Transverse Bore through the Central Shaft
113 Third Transverse Bore through the Central Shaft
114 Longitudinally Extending Transverse Slot through the Central Shaft
120 Ball
121 Transverse Bore through Ball
129 Central Passage through Ball
130 Socket
140 Upper Portion of Socket
141 Collar on Upper Portion of Socket
142 Upper Surface of Collar
143 V-Shaped Segments of Collar
143a First Longitudinally Sloped Leg of First V-Shaped Surface
143b Second Longitudinally Sloped Leg of First V-Shaped Surface
143n Central Nadir defined by First V-Shaped Surface
144 Rotational Stops at distal ends of Legs
149 Central Passage through Upper Portion of Socket
150 Lower Portion of Socket
151 Internal Peripheral Shoulder on Lower Portion of Socket
159 Central Passage through Lower Portion of Socket
160 Fitting
161 Transversely Extending Annular Flange in Fitting
162 Lower Surface of Transversely Extending Annular Flange
163 Transverse Bore through Fitting
134 Longitudinal Threaded Bores in Fitting
168 Rocker Plate
169 Central Passage through Fitting
170 Spring
180 Cap
182 Longitudinally Extending Upwardly Open Transverse Slot through the Cap
189 Central Passage through Cap
190 Mounting Element
191 Upwardly Open Concavity defined by Mounting Element
192 Transverse Bore through Mounting Element
199 Central Passage through Mounting Element
201 First Retention Pin
202 Second Retention Pin
203 Third Retention Pin
204 Fourth Retention Pin
205 Washer
206 Set Screws
250 Switch
251 First Contact Plate
252 Second Contact Plate
253 Spacer Plate
300 Head Position Module
310 Signal Generating Feature
320 Recording Feature
340 Escalating Signal Feature
$S_1$ Distress Signal
↪Bypass Signal
400 Abuse Module
$S_2$ Abuse Signal

Construction

As shown in FIG. 1, the infant simulator 10 comprises a doll 10 having a neck linkage 100 connecting a head 20 to a torso 30. The head 20 defines a longitudinal primary axis 20x. When the primary head 20 occupies a central rest position relative to the torso 30, the longitudinal primary axis 20x defined by the head 20 defines a longitudinal resting axis 30x relative to the torso 30. The head 20 is preferably biased into the rest position relative to the torso 30 by a biasing means (e.g., a spring 170). The neck linkage 100 allows gravitational tilting of the head 20 relative to the torso 30 in any transverse direction from the longitudinal resting axis 30x as between the rest position and a bent position when the head 20 is horizontally tilted greater than a defined amount from a vertical position of gravitational equilibrium (i.e., beyond a trip angle) unless properly supported by a care provider (not shown). The neck linkage 100 provides a realistically appearing neck as well as a realistic movement of the head 20 relative to the torso 30 in all transverse directions when the head 20 is tilted beyond the trip angle and is not properly supported.

The doll 10 preferably has the appearance of a young infant (e.g., approximately 40 to 80 cm in length and approximately 3 to 5 kg in weight). The doll 10 can be sculpted to depict the skin color and facial feature of various ethnic groups including specifically, but not exclusively, African American, Asian, Caucasian, Hispanic, and Native American.

Figure 3:
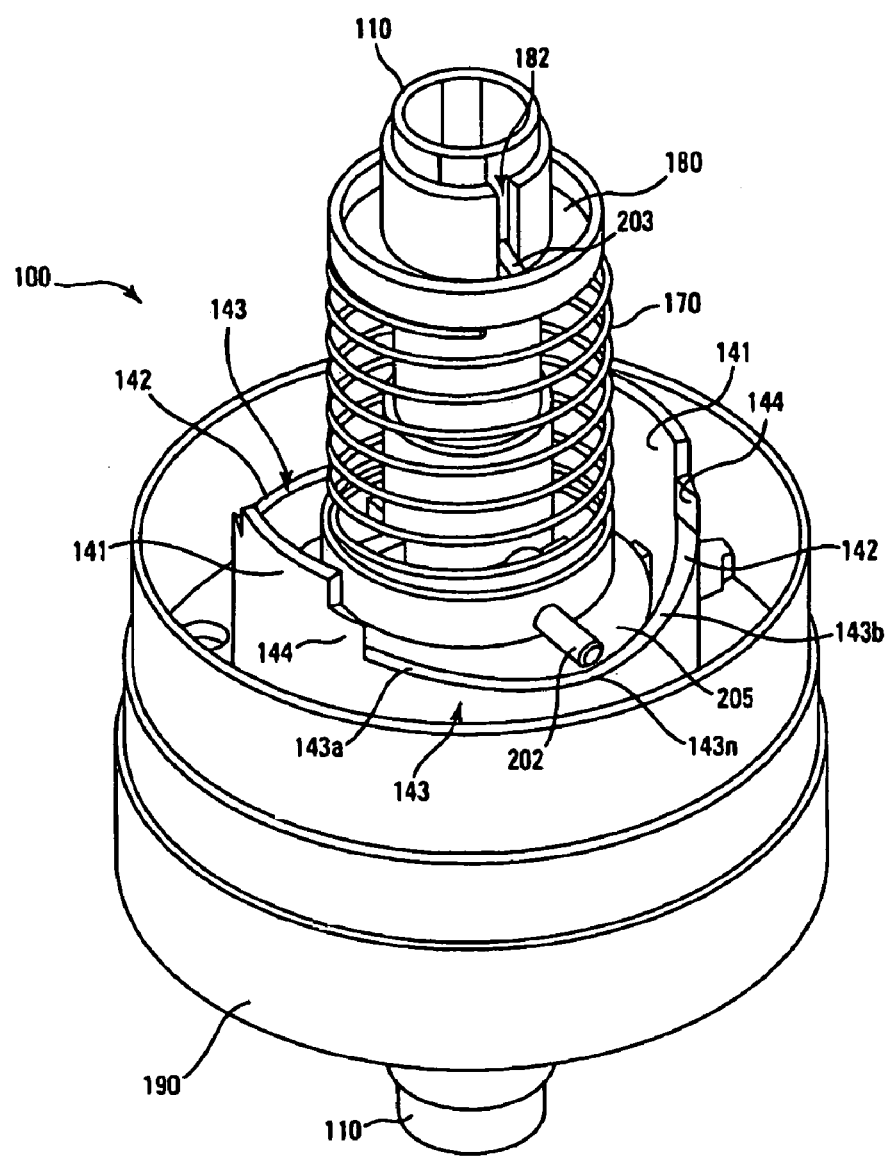
FIG. 3 is a perspective view of one embodiment of the neck linkage portion of the invention shown in FIG. 1.
Figure 4:
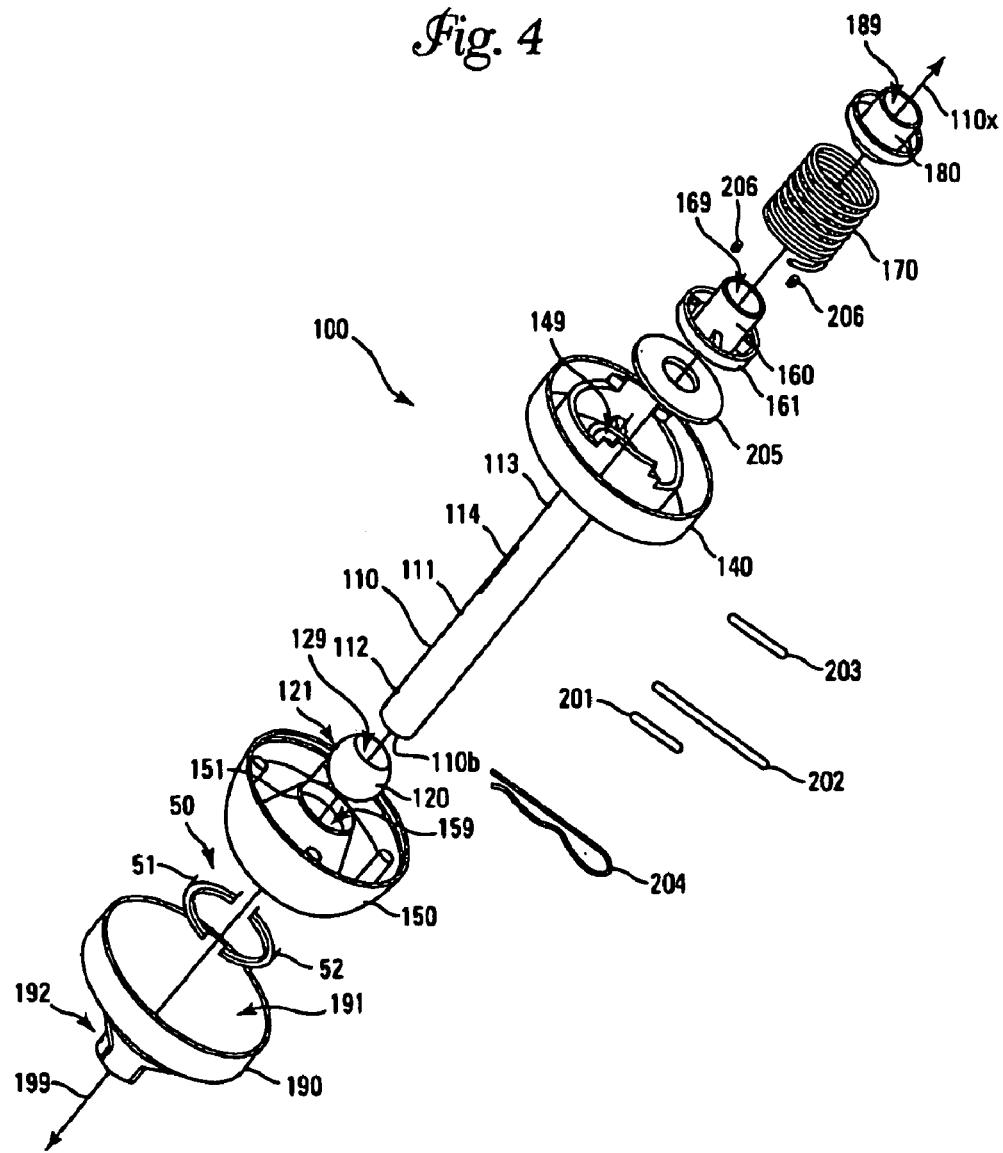
FIG. 4 is an exploded perspective view of the neck linkage portion of the invention shown in FIG. 3.
Figure 5:
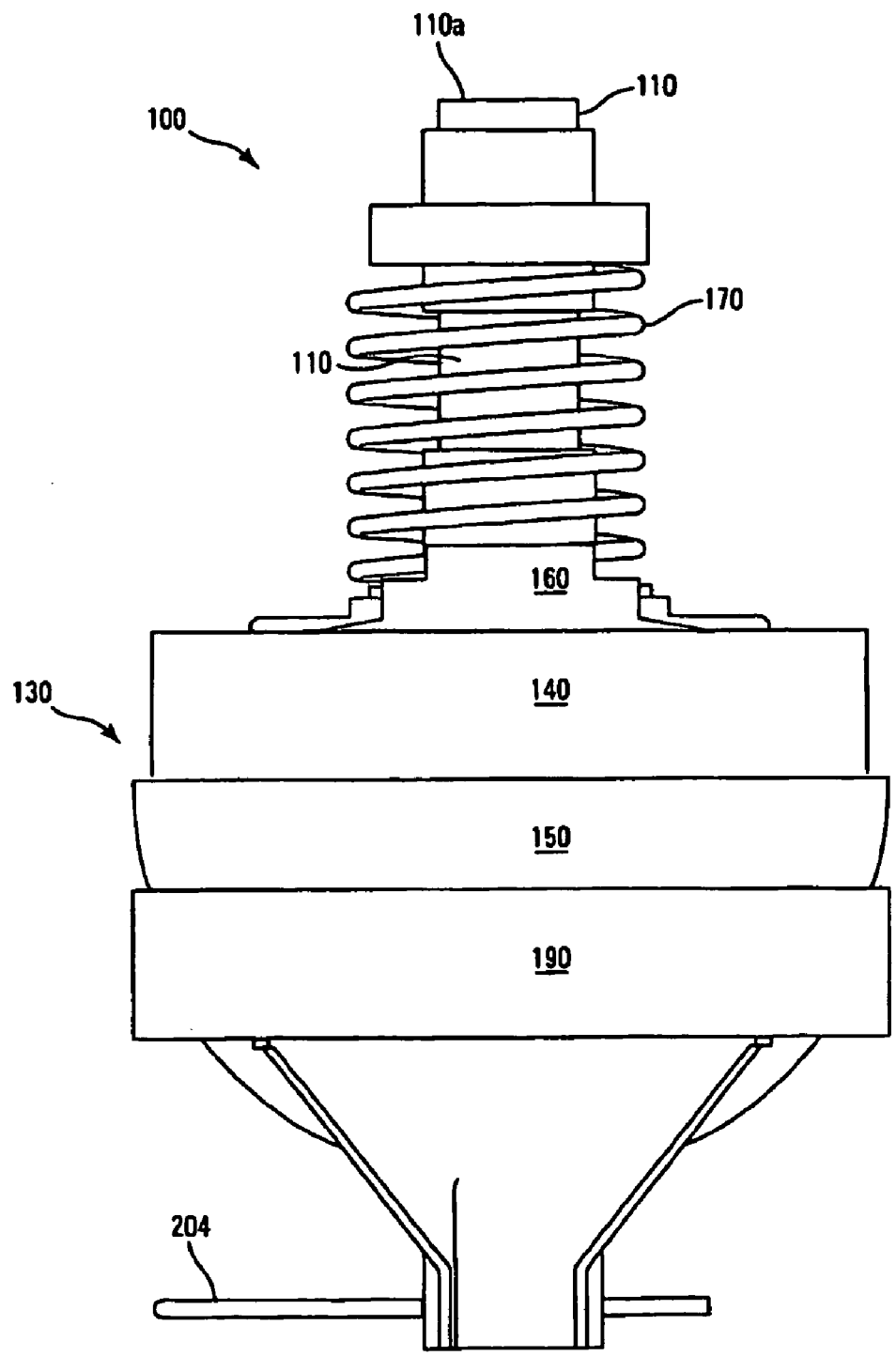
FIG. 5 is a side view of the neck linkage portion of the invention shown in FIG. 3.

A preferred neck linkage 100 is shown in FIGS. 3–5. The preferred neck linkage 100 includes a central shaft 110, a ball 120, a socket 130 including an upper portion 140 and a lower portion 150, a fitting 160, a spring 170, a cap 180 and a mounting element 190.

The central shaft 110 extends through a central passage 129 in the ball 120. The ball 120 is fixedly attached to the central shaft 110 by a retention pin 201 which is frictionally engaged within transversely aligned bores 111 and 121 in the central shaft 110 and ball 120 respectively.

The upper portion 140 of the socket 130 is slidably engaged along the longitudinal length of the central shaft 110 between the upper end 110a of the central shaft 110 and the ball 120. The central shaft 110 extends through a central passage 149 in the upper portion 140 of the socket 130. The lower portion 150 of the socket 130 is slidably engaged along the longitudinal length of the central shaft 110 between the lower end 110b of the central shaft 110 and the ball 120. The central shaft 110 extends through a central passage 159 in the lower portion 150 of the socket 130. The ball 120 is captured between upper 140 and lower 150 portions of the socket 130 to form a ball-and-socket joint.

The area of actual contact between the lower portion 150 of the socket 130 and the central shaft 110 is longitudinally minimized (e.g., planar contact) so that the lower portion 150 of the socket 130 may rotatably reposition relative to the longitudinal primary axis 110x of the central shaft 110 as the head 20 tilts relative to the torso 30.

A fitting 160, spring 170, and cap 180 are sequentially engaged along the longitudinal length of the central shaft 110 between the upper portion 140 of the socket 130 and the upper end 110a of the central shaft 110.

The central shaft 110 extends through a central passage 169 in the fitting 160. The fitting 160 has a transversely extending annular flange 161 defining a lower surface 162 which engages the upper portion 140 of the socket 130. The fitting 160 is attached to the central shaft 110 by a retention pin 202 which is engaged within transversely aligned bores 163 in the fitting 160 and longitudinally extending transversely aligned slots 114 in the central shaft 110. The longitudinally elongated nature of the slots 114 in the central shaft 110 permit limited longitudinal sliding of the fitting 160 along the longitudinal length of the central shaft 110. The retention pin 202 may be secured into position within the transversely aligned bores 163 in the fitting 160 by means of set screws 206 threadably engaged within threaded longitudinal bores 164 in the fitting 160 which extend into and communicate with a corresponding transverse bore 163 in the fitting 160.

A washer 205 may be positioned between the fitting 160 and the upper portion 140 of the socket 130 for providing a smooth and flat surface for contacting the lower surface 162 of the fitting 160.

The central shaft 110 extends through a central passage 189 in the cap 180. The spring 170 is coaxially positioned around the central shaft 110 and captured in a partially compressed state between the fitting 160 and the cap 180 whereby the spring 170 longitudinally biases the fitting 160 and the upper portion 140 of the socket 130 towards the lower portion 150 of the socket 130 so as to bias the upper portion 140 of the socket 130 into engagement with an internal peripheral shoulder 151 on the lower portion 150 of the socket 130 and thereby secure the ball 120 within the socket 130. The cap 180 is secured to the central shaft 110 by a retention pin 203 which is engaged within longitudinally extending, upwardly open and transversely aligned slots 182 in the cap 180 and transversely aligned bores 113 in the central shaft 110. The longitudinally elongated and upwardly open nature of the slots 182 in the cap 180 permit the spring 170 to be partially compressed between the fitting 160 and the cap 180 by sliding the cap 180 onto the central shaft 110, pressing downward upon the cap 180 towards the fitting 160 so as to compress the spring 170, inserting the retention pin 203 into the transversely aligned bores 113 in the central shaft 110, longitudinally aligning the ends (unnumbered) of the inserted retention pin 203 with the slots 182 in the cap 180, and then allowing the spring 170 to force the cap 180 upward along the length of the central shaft 110 until the retention pin 203 contacts the lower closed ends (unnumbered) of the slots 182 in the cap 180 or other structural component of the cap 180.

The mounting element 190 is fixedly attached to the central shaft 110 between the lower portion 150 of the socket 130 and the lower end 110b of the central shaft 110 by a retention pin 204 which is frictionally engaged within transversely aligned bores 112 and 192 in the central shaft 110 and mounting element 190 respectively. The central shaft 110 extends through a central passage 199 in the mounting element 190. The mounting element 190 has an upwardly open concavity 191 for nesting with the lower portion 150 of the socket 130 so as to allow rotary motion of the lower portion 150 of the socket 130 relative to the mounting element 190.

A collar 141 extends upward from the upper surface (unnumbered) of the upper portion 140 of the socket 130 concentric with the central passage 149 through the upper portion 140 of the socket 130. The upper surface 142 of the collar 141 defines diametrically opposed V-shaped segments 143, each having a central nadir 143n and a pair of upwardly sloped circumferential legs 143a and 143b extending in a clockwise and counterclockwise direction from the central nadir 143n respectively. Upwardly extending stops 144 are provided at the distal end (unnumbered) of each leg 143a and 143b.

The transverse ends (unnumbered) of the pin 202 extending through the fitting 160 rest upon the upper surface 142 of the collar 141. The spring 170 biases the pin 202 towards the upper surface 142 of the collar 141 and thereby encourages the ends of the pin 202 to rest within the diametrically opposed central nadirs 143n of each V-shaped segment 143 of the collar 141.

The head 20 of the infant simulator 10 is secured to the upper portion 140 of the socket 130. The torso 30 of the infant simulator 10 is secured to the mounting element 190. The upper portion 140 of the socket 130 may be secured to the head 20 and the mounting element 190 may be secured to the torso 30 by any suitable means, including adhesive bonding, thermal welding, friction fitting, a plurality of latches, a retaining ring, threading, snap fasteners, etc.

Since the head 20 and torso 30 are preferably constructed of a soft flexible material simulating the skin of an infant, the upper portion 140 of the socket 130 is positioned within and attached to the head 20 at a neck opening 29 in the head 20, and the mounting element 190 is positioned within and attached to the torso 30 at a neck opening 39 in the torso 30 for providing the structural rigidity necessary to accommodate repetitive tilting of the head 20 relative to the torso 30.

A sensor may cooperatively engage the neck linkage 100 for sensing positioning of the head 20 as between an acceptable rest position and an unacceptable bent position. Exemplary suitable sensors include specifically, but not exclusively, mechanical switches such as a toggle switch, magnetic sensors, optical sensors, etc.

The sensor can be positioned so as to be actuated and sense a bent-neck occurrence at any desired trip angle so long as the trip angle bears at least some resemblance to the angle at which injury is likely with an actual infant. The trip angle, below which the head 20 is sensed in an acceptable rest position and above which the head 20 is sensed in an unacceptable bent position, is preferably between about 10° and 45°, most preferably between about 15° and 25°. A trip angle of less than 10° can result in false reporting of a bent-neck occurrence as such angles can be reached during normal safe handling of an infant, while trip angles of greater than 45° can result in missed reporting of a bent-neck occurrence as less severe angles are often indicative of a lack of proper head support.

A particularly suitable sensor is a switch 50 comprised of a first electrical contact and a second electrical contact cooperatively engaging the neck linkage 100 for sensing positioning of the head 20 in an unacceptable bent position by opening/closing whenever the head 20 tilts more than a predetermined amount relative to the torso 30 (i.e., beyond a trip angle) in any transverse direction from the longitudinal resting axis 30x. One such switch 50, shown in FIG. 4, includes first 51 and second 52 semicircular electrical contacts coaxialy mounted around the central shaft 110 between the socket 130 and the mounting element 190. The electrical contacts 51 and 52 are biased towards one another so that they provide a normally closed electrical circuit. The electrical contacts 51 and 52 are forced apart and the switch 50 opened by the central shaft 110 when the central shaft 110 is angled a predetermined distance by tilting of the head 20 into an unacceptable bent position which exceeds a predetermined amount relative to the torso 30 (i.e., beyond a trip angle) in any transverse direction from the longitudinal resting axis 30x.

Figure 7:
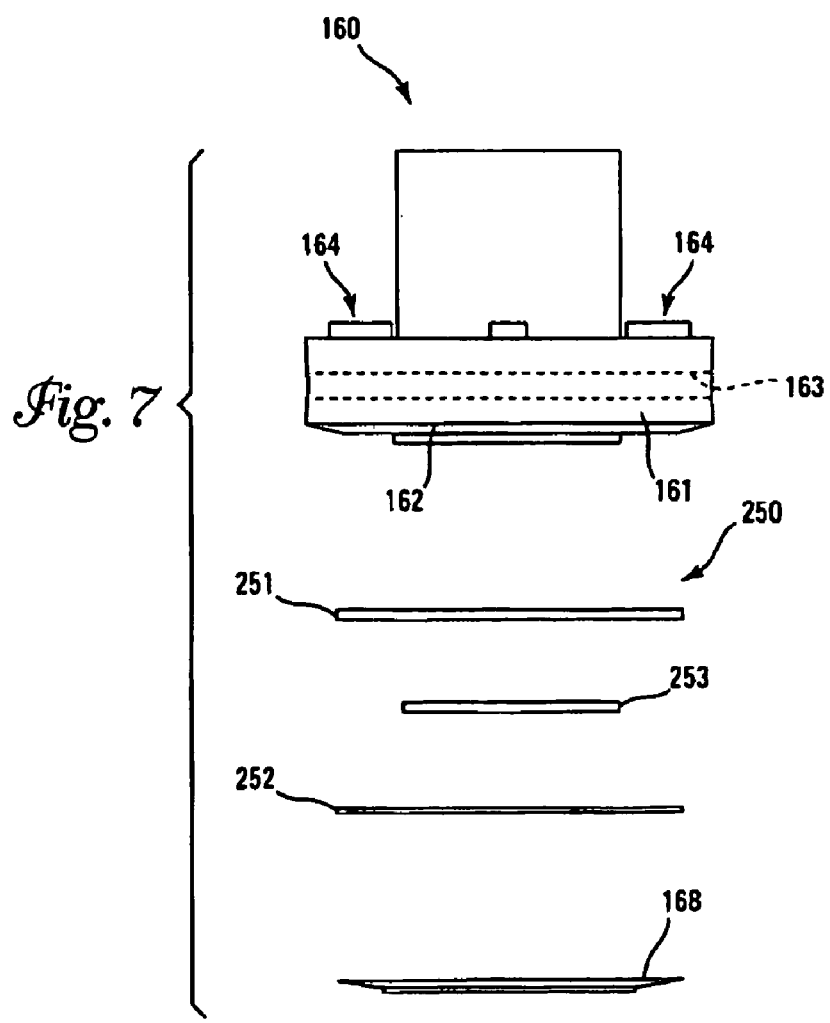
FIG. 7 is an exploded perspective view of the fitting shown in FIG. 6.

An alternative electrical switch 250, shown in FIG. 7, is a normally open switch 250 comprised of a first disc-shaped electrical contact 251 and a flexible second disc-shaped electrical contact 252 coaxially positioned around the central shaft 110 and captured between the fitting 160 and the upper portion 140 of the socket 130. A nonconductive disc-shaped spacer 253 is coaxially positioned around the central shaft 110 between the first 251 and second 252 electrical contacts so that the switch 250 is normally open. The nonconductive spacer 253 has a diameter which is substantially less than the diameter of the first 251 and second 252 electrical contacts. This allows the periphery of the flexible second contact 252 to be bent towards and contact the first electrical contact 251 and thereby close the switch 250 when the central shaft 110 is angled by tilting of the head 20 into an unacceptable bent position which exceeds a predetermined amount relative to the torso 30 (i.e., beyond a trip angle) in any transverse direction from the longitudinal resting axis 30x.

When the switch 50 is opened, or the switch 250 is closed, an electrical signal is transmitted to a central microcontroller unit 40 of the sort detailed in U.S. Pat. No. 5,443,388 issued to Jurmain et al. The central microcontroller unit 40 is designed and programmed to (i) record receipt of the electrical signal as a bent-neck occurrence and/or (ii) producing a perceptible distress signal $S_1$ in response to receipt of the electrical signal. Other data can also be recorded and/or processed by the central microcontroller unit 40 as desired.

When a distress signal $S_1$ is generated in response to receipt of the electrical signal, the central microcontroller unit 40 may optionally continue the distress signal $S_1$, (e.g., screaming) for a predetermined period of time (e.g., 10 seconds to 10 minutes), much as an infant would be expected to continue screaming and/or crying after experiencing such a traumatic event.

The head position sensor can also be configured to sense the duration of a bent-neck episode, (i.e., the length of time the head 20 remains in an unacceptable bent position) and transmit such duration data to the central microcontroller unit 40. The duration data may be used to establish the intensity and/or duration of the perceptible distress signal $S_1$ generated during the bent-neck episode (e.g., a cry for the first two minutes followed by a piercing scream thereafter until the head 20 is returned to an acceptable position), and/or simply recorded for subsequent review by an educator or other administrator (e.g., duration of each bent-neck episode occurring within an assignment period or total duration of all bent-neck episodes occurring within an assignment period).

The neck linkage 100 may also optionally be equipped with a sensor (not shown) capable of measuring the force with which the head 20 is allowed to flop from an acceptable rest position to an unacceptable bent position and transmitting such force data to the central microcontroller unit 40. The force data, as with the duration data, may be used to establish the intensity and/or duration of the perceptible distress signal $S_1$ generated in response to the bent-neck occurrence (e.g., a short cry for a bent-neck occurrence effected with minor force, a long loud cry for a bent-neck occurrence effected with modest force, and a scream followed by an extended period of crying for a bent-neck occurrence effected with significant force), and/or simply recorded for subsequent review by an educator or other administrator.

Such force data may also be used by the central microcontroller unit 40 to reduce the recording of false bent-neck occurrences (i.e., instances when the head 20 is properly supported but happens to reach the trip angle at a slow speed) by preventing the recording of a bent-neck occurrence, even though the head 20 reaches the trip angle and activates the switch 50, unless the force exerted by the head 20 also exceeds a predetermined threshold indicative of mishandling or neglect. Similar control on the reporting of false bent-neck occurrences can be achieved by providing a spring 170 with sufficient biasing strength to maintain the head 20 in the rest position so long as the longitudinal primary axis 20x defined by the head 20 is tilted less than a defined amount from vertical (e.g., 45°).

Figure 6:
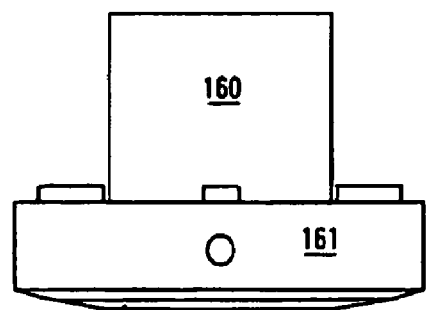
FIG. 6 is an enlarged side view of the fitting component of the neck linkage portion of the invention shown in FIG. 3.

A mechanical solution effective for reducing the recording of false bent-neck occurrences is shown in FIGS. 6 and 7. As shown in FIG. 6, the lower surface 162 of the fitting 160 is beveled at an angle which is slightly less than the trip angle. Alternatively, as shown in FIG. 7, a rocker plate 168 having a beveled lower surface (unnumbered) may be provided between the lower surface 162 of the fitting 160 and the washer 205. The fitting 160 tilts relative to the upper portion 140 of the socket 130 when the head 20 tilts relative to the torso 30. Before the trip angle is reached, the beveled lower surface 162 of the fitting 160 or the beveled lower surface of the rocker plate 168 will rest flush upon the washer 205 intermediate the fitting 160 and the upper portion 140 of the socket 130 and thereby provide an intermediate rest position. Absent sufficient force to tilt the fitting 160 beyond the intermediate rest position by lifting the fitting 160 or rocket plate 168 onto the peripheral edge (unnumbered) of the fitting 160 or rocket plate 168, the head 20 will not reach the trip angle.

The entire infant simulator 10, including the neck linkage 100, should be sufficiently sturdy to withstand rough handling by frustrated care providers. Hence, the materials of construction and the means for attaching the various components should be selected to ensure that the infant simulator 10 will survive such anticipated abuse.

The components of the neck linkage 100 may be formed from a number of suitable materials including metals, such as aluminum and steel, and plastics such as polyacrylates (PA), acrylonitrile-butadiene-styrene terpolymers (ABS), and polyvinyl chloride (PVC).

In a first embodiment of the infant simulator 10, a recording function within the central microcontroller unit 40 records sensed bent neck occurrence for later review by the program administrator. The specific information recorded and reported by the central microcontroller unit 40 can range from the relatively simple to the complex. For example, the central microcontroller unit 40 can be programmed to simply record and report the occurrence of at least one sensed bent neck occurrence during the assignment period. Alternatively, the central microcontroller unit 40 can record and report the number of sensed bent neck occurrences during an assignment period and the duration of each sensed bent neck episode. A nonexhaustive list of options for recording and reporting bent neck occurrence data is set forth in Table One, provided below.

TABLE ONE (OPTIONS FOR RECORDING AND REPORTING BENT NECK OCCURRENCE DATA)

| OPTION | DESCRIPTION | DATA RECORDED | SAMPLE REPORT |
|---|---|---|---|
| 1 | Records and reports occurrence of first bent neck occurrence only. | YES/NO | Light ON/OFF |
| 2 | Records and reports number of separate bent neck occurrences. | Number | "3." |
| 3 | Records and reports highest relative force of a bent neck occurrence sensed during an assignment period. | Force Level (Low/High) | High |
| 5 | Records and reports the number of bent neck occurrences sensed during an assignment period and the relative force of which each bent neck occurrence. | # Force Level (Low/High) | 1: Low 2: Low 3: High 4: Low |
| 6 | Records and reports the number of bent neck occurrences of each force category (i.e., high and low) sensed during an assignment period. | # Low # High | 3 Low 1 High |
| 7 | Records and reports the number and duration of each bent neck occurrence during an assignment period. | #/Seconds | 1: 01 2: 01 3: 08 4: 02 |

In a second embodiment of the infant simulator 10, the central microcontroller unit 40 is connected to a system (not shown) capable of generating a perceptible distress signal $S_1$, such as an audible cry or scream. The central microcontroller unit 40 is programmed to generate the perceptible distress signal $S_1$ when a bent neck occurrence is sensed. Generation of the perceptible distress signal $S_1$ warns the student caring for the infant simulator 10 that the head 20 of the infant simulator 10 has not been properly supported and is in a dangerous bent position. The distress signal $S_1$ can be terminated, optionally after an appropriate delay, and timing of the bent neck occurrence episode, by returning the head 20 to the rest position relative to the torso 30, thereby reopening the switch 50 and terminating transmission of an electrical signal from the switch 50 to the central microcontroller unit 40.

The central microcontroller unit 40 can be programmed to generate the perceptible distress signal $S_1$ only at the beginning of a bent neck episode (i.e., generate a three second signal as soon as a bent neck occurrence is sensed), continuously throughout a bent neck episode, or continuously throughout a bent neck episode and for an additional time period after the bent neck episode has ceased, for purposes of simulating injury to the infant simulator 10.

A preferred embodiment of the infant simulator 10 combines both the recording/reporting and signaling systems.

The distress signal $S_1$ may be intensified based upon (i) an increase in the maximum sensed force of the bent neck occurrence (i.e., the acceleration at which the head 20 flopped into the bent position), and/or (ii) an increase in the duration of the bent neck occurrence episode. The escalation can be effected in a variety of ways. An example of each is set forth in Table Two, provided below. For example, an audible cry can be escalated from a soft cry to a loud cry or from a cry to a scream. Similarly, a light can be changed from white to red.

The distress signal $S_1$ can be escalated through any number of continuous or stepped levels as desired. A simple single stepped escalation—normal to increased—is relatively simple to implement and generally effective for providing the student with appropriate notice of a bent neck occurrence.

TABLE TWO (ESCALATING DISTRESS SIGNAL $S_1$)

| STRENGTH OF PERCEPTIBLE DISTRESS SIGNAL (AUDIBLE) | BENT NECK DURATION (SECONDS) | ACCELERATION |
|---|---|---|
| 1st Intensity (cry) | <5 | Low |
| 2nd Intensity (scream) | >5 | High |

In a similar fashion, the central microcontroller unit 40 may be programmed to de-escalate the strength, intensity and/or severity of an escalated distress signal $S_1$ generated by the infant simulator 10 once the head 20 has been repositioned into the rest position for purposes of increasing the reality of the simulation (e.g., the infant simulator 10 immediately decreases an escalated perceptible distress signal $S_1$ from a shriek to a cry upon return of the head 20 to the rest position, and five minutes later terminates generation of the cry).

The infant simulator 10 with neck linkage 100 may also be programmed to detect and report abuse resulting from repeated striking or shaking of the infant simulator 10. Rapid and repetitive bent neck occurrences occurring within a short time period (e.g., three bent neck occurrences within about two seconds) are usually the result of intentional abuse. Exemplary of such intentional abuses are striking and/or shaking an infant. While certain exceptions apply to this general statement, as exemplified by a care-provider falling down a flight of stairs while holding an infant, reporting of apparent intentional abuse would assist program administrators in providing meaningful feedback to the student and appropriate follow-up training and/or counseling.

Figure 8A:
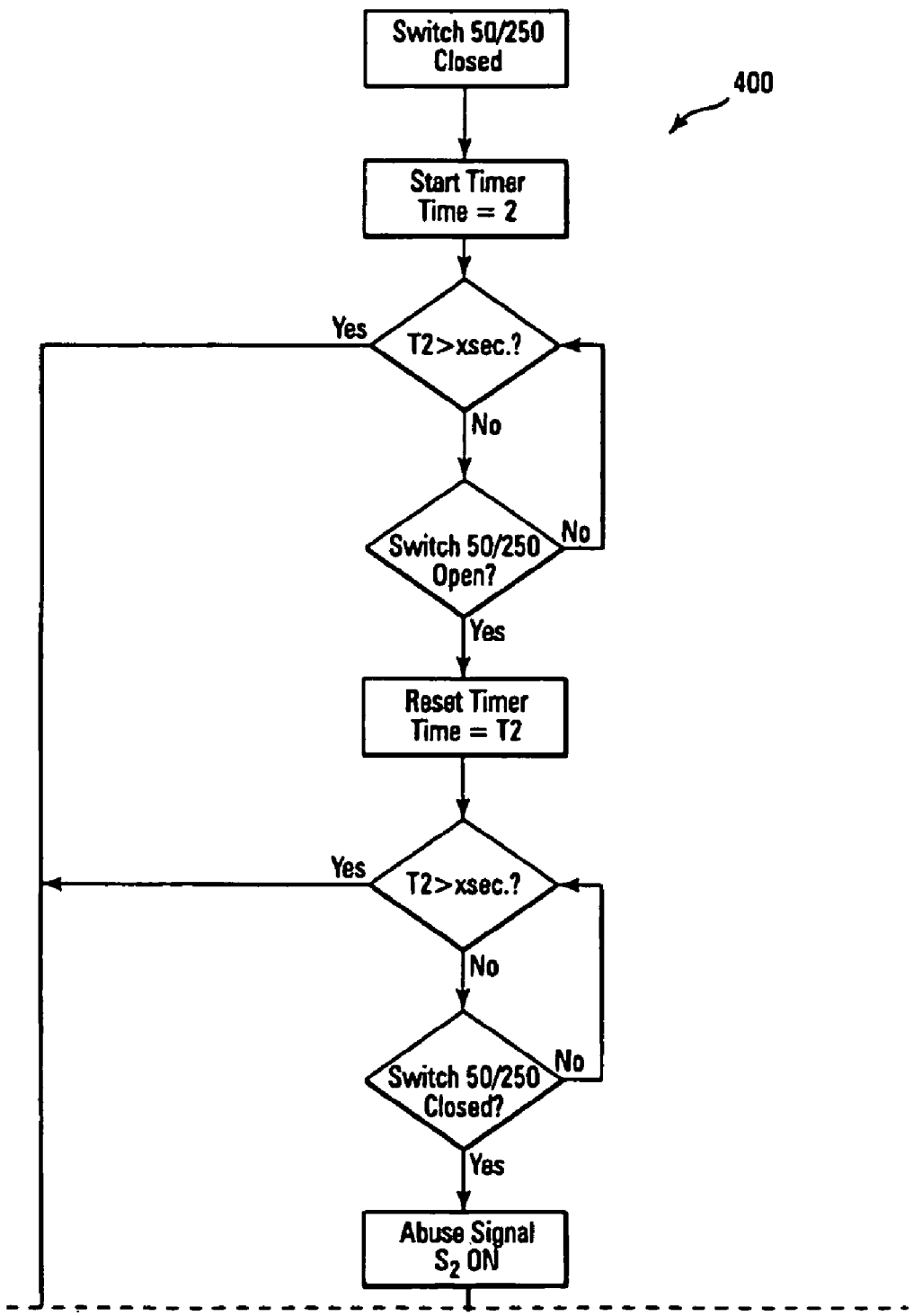
FIGS. 8A and 8B are schematic flowcharts of one embodiment of an abuse module of the invention.
Figure 8B:
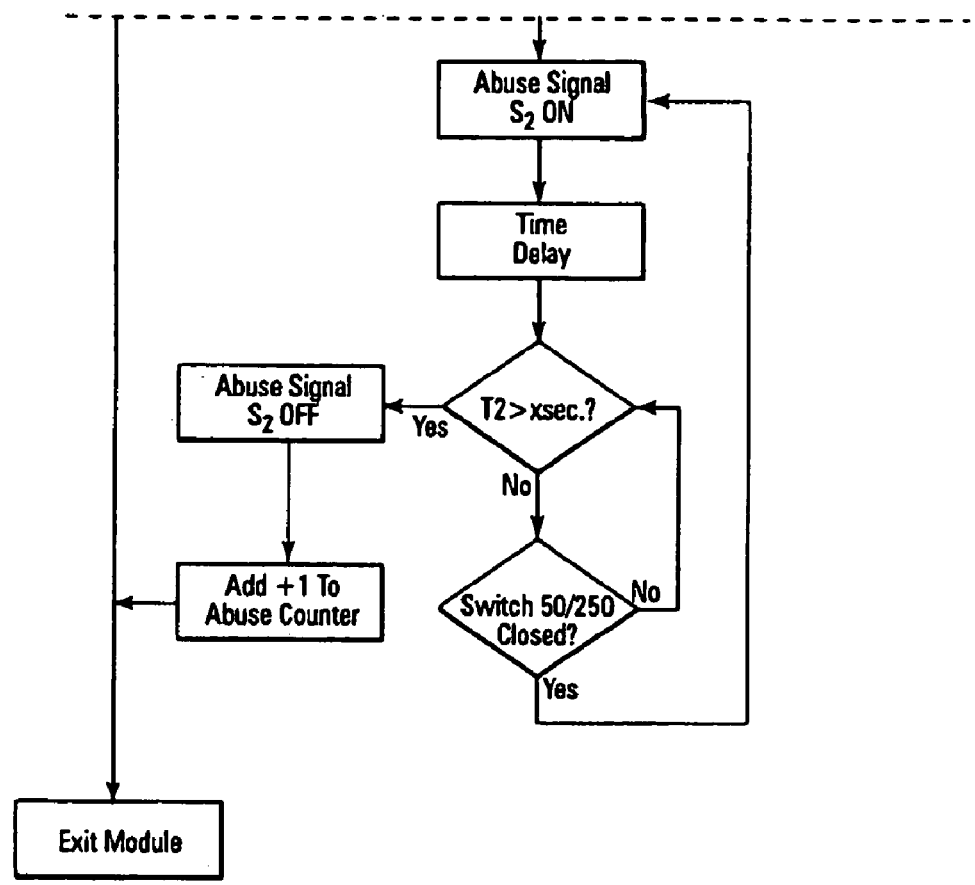

As shown in FIGS. 8A and 8B, the infant simulator 10 can detect and report intentional abuse resulting from shaking or repetitive striking of the infant simulator 10 through use of an abuse module 400 wherein the central microcontroller unit 40 is programmed to recognize rapid and repetitive bent neck occurrences as an intentional abuse event and generate an abuse signal S2 and/or record an abuse event.

In one embodiment, a recording function within the central microcontroller unit 40 records the occurrence of an intentional abuse event whenever rapid and repetitive bent neck occurrences are detected for later review by the program administrator (not shown). The specific information recorded and reported by the central microcontroller unit 40 can range from the relatively simple to the complex. For example, the central microcontroller unit 20 can be programmed to simply record and report the occurrence of an intentional abuse event during the assignment period. Alternatively, the central microcontroller unit 40 can record and report the total number of sensed intentional abuse events during an assignment period and the duration of each sensed event. A nonexhaustive list of options for recording and reporting intentional abuse event data is set forth in Table Three, provided below.

TABLE THREE (OPTIONS FOR RECORDING AND REPORTING INTENTIONAL ABUSE EVENT DATA)

| OPTION | DESCRIPTION | DATA RECORDED | SAMPLE REPORT |
|---|---|---|---|
| 1 | Records and reports occurrence of first abuse event. | YES/NO | ABUSE: Light ON/OFF |
| 2 | Records and reports number of abuse events. | Number | ABUSE 2 |
| 3 | Records and reports the number and duration of abuse events during an assignment period. | #/Seconds | ABUSE 1: 02<br>ABUSE 2: 01<br>ABUSE 3: 18<br>ABUSE 4: 03 |

In another embodiment, the central microcontroller unit 40 is connected to a system (not shown) capable of generating a perceptible abuse signal $S_2$, such as an audible cry or scream. The central microcontroller unit 40 is programmed to generate the perceptible abuse signal $S_2$ when intentional abuse is sensed. Generation of the perceptible abuse signal $S_2$ informs the student caring for the infant simulator 10 that the infant simulator 10 is being abused. The abuse signal $S_2$ can be terminated, optionally after an appropriate delay, and any timing of the abuse period ended, by returning the head 20 to an acceptable position and supporting the head 20 in that position, thereby opening the switch 50 and terminating transmission of an electrical signal through the switch 50 to the central microcontroller unit 40.

The central microcontroller unit 40 can be programmed to generate the perceptible abuse signal $S_2$ only at the beginning of an abuse period (i.e., generate a three second signal as soon as shaking is sensed), continuously throughout an abuse period, or continuously throughout an abuse period and for an additional time period after abuse of the infant simulator 10 has ceased for purposes of simulating injury to the infant simulator 10.

A preferred embodiment combines both the recording/reporting and signaling systems for the shaken infant module (not shown).

Referring to FIGS. 8A and 8B, an exemplary abuse module 400 is entered whenever switch 50 is CLOSED as a result of a bent neck occurrence. Upon entering the abuse module 400, a timer is started and the module 400 waits for a first defined period of time (e.g., about 0.2 to 5 seconds) for receipt of an electrical signal indicating that switch 50 is OPEN (hereinafter referenced as $S_{OPEN}$). If $S_{OPEN}$ is not received within the first waiting period, the central microcontroller unit 40 exits the abuse module 400. If $S_{OPEN}$ is received within the first waiting period, the timer is reset and the module 400 waits for a second defined period of time (e.g., about 0.2 to 5 seconds) for receipt of an electrical signal that switch 50 is CLOSED (hereinafter referenced as $S_{CLOSED}$). If $S_{CLOSED}$ is not received within the second waiting period, the central microcontroller unit 40 exits the abuse module 400. If $S_{CLOSED}$ is received within the second waiting period, an intentional abuse event has been detected (i.e., the head 20 has moved from an acceptable position to an acceptable position (a first bent neck occurrence) back to an acceptable position and once again into an unacceptable position (a second bent neck occurrence) with the span of about 0.4 to 10 seconds). Upon detecting intentional abuse, an abuse signal $S_2$ is generated for a defined period of time representative of the time period an actual infant would likely scream and cry after being subjected to such abuse (e.g., 2 to 60 minutes). The timer is then reset, and the module 400 once again waits for a third period of time (e.g., about 0.2 to 3 seconds) for receipt of a $S_{CLOSED}$ signal indicating that the head 20 has remained or is once again in an unacceptable position. If $S_{CLOSED}$ is not received during the third waiting period, the central microcontroller unit 40 exits the abuse module 400. If $S_{CLOSED}$ is received during the third waiting period, the abuse signal $S_2$ is generated for another screaming period. The abuse module 400 continues to generate the abuse signal $S_2$ through sequential screaming periods until $S_{CLOSED}$ is not detected during a third waiting period.

The abuse signal $S_2$ may be intensified, in accordance with the ancillary feature of providing an escalating demand signal, based upon the duration of the abuse period.

Use

Tilting

The head 20 is attached to the upper portion 140 of the socket 130. The torso 30 is attached to the mounting element 190. The mounting element 190 is fixedly attached to the central shaft 110 such that the torso 30 and central shaft 110 remain longitudinally aligned at all times. The socket 130 is rotatably attached to the central shaft 110 with the spring 170 biasing the socket 130 into a central rest position. Tilting of the head 20 relative to the torso 30 from the central rest position causes longitudinal rotation of the socket 130 about the ball 120. Such longitudinal rotation of the socket 130 causes the upper portion 140 of the socket 130 to become transversely angled relative to the lower surface 162 of the fitting 160 and thereby pivot against the fitting 160 such that the upper portion 140 of the socket 130 contacts only a peripheral segment of the lower surface 162 of the fitting 160. If the trip angle is reached, the normally open switch 50 is electrically closed so as to transmit a bent neck occurrence signal to the central microcontroller unit 40.

Rotation

The head 20 is attached to the upper portion 140 of the socket 130. The upper portion 140 of the socket 130 is biased into a "forward-facing" position by the spring 170 which biases the pin 202 towards the upper surface 142 of the collar 141 on the upper portion 140 of the socket 130 and thereby encourages the ends of the pin 202 to rest within the diametrically opposed central nadirs 143n of each V-shaped segment 143 of the collar 141. Rotation of the head 20 about the longitudinal primary axis 110x of the central shaft 110 causes the pin 202 to ride up on the sloped legs, 143a or 143b dependant upon whether the rotation is clockwise or counterclockwise, thereby causing the fitting 160 to longitudinally slide upward along the central shaft 110 and further compress the spring 170. Rotational stops 144 provided at the distal end of each leg 143a and 143b prevents overrotation of the head 20 (i.e., limits rotation to between about 10° to 90° in either direction from the forward facing position.

Upon release of the force effecting rotation of the head 20, the force of the spring 170 acting downward upon the fitting 160 causes the pin 202 to slide back down the sloped legs 143a or 143b and back into the rest position within the diametrically opposed central nadirs 143n of each V-shaped segment 143 of the collar 141.

Sensing, Signaling and Reporting

The switch 50 detects the position of the head 20 as between the centrally biased acceptable position and the unacceptable bent position and signals the central microcontroller unit 40 when the head 20 is detected in the unacceptable bent position.

Figure 2:
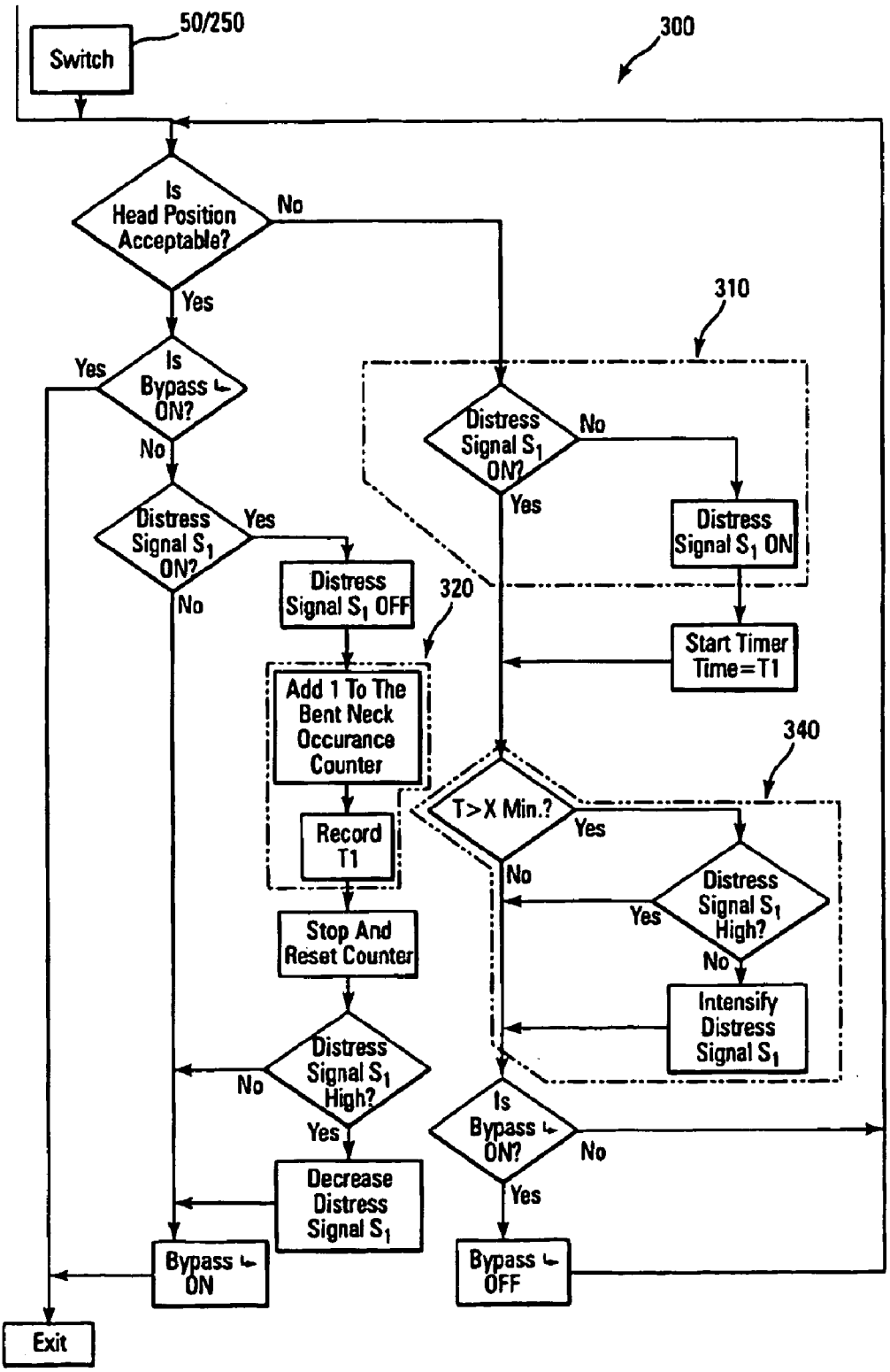
FIG. 2 is a schematic flowchart of one embodiment of the invention.

Referring to FIG. 2, the head position module 300 is bypassed so long as the head 20 is in an acceptable position relative to the torso 30. However, when the head position module 300 receives a signal from the switch 50 that the head 20 is in an unacceptable bent position, the head position module 300 initiates generation of a perceptible distress signal $S_1$ by means of the signal generating feature 310 embedded within the module 300, starts timing the length of time the perceptible distress signal $S_1$ is generated, and turns OFF the bypass signal ↪.

If the perceptible distress signal $S_1$ is generated for longer than a predetermined time x (e.g., 2 minutes), the head position module 300 increases the intensity of the perceptible distress signal $S_1$ by means of the escalating signal feature 340 embedded within the module 300. The perceptible distress signal $S_1$ is generated at the increased intensity thereafter until the head 20 is returned to the acceptable rest position.

Once the head 20 is returned to the acceptable rest position, generation of the perceptible distress signal $S_1$ is turned OFF, the occurrence of a bent neck occurrence is counted, the duration of time during which the head 20 was in an unacceptable bent position (i.e., the length of time the perceptible distress signal $S_1$ was generated) recorded by the recording feature 320, the timer is stopped and reset, the intensity of the perceptible distress signal $S_1$ is checked and returned to normal if intensified, the bypass signal ↪is turned back ON, and the module 300 is exited.

In order to allow the central microcontroller unit 40 to cycle through other modules even though the head 20 is improperly positioned for a prolonged period of time, the central microcontroller unit 40 can be programmed to terminate generation of the perceptible distress signal $S_1$ and exit the head position module 300 after a defined time period (e.g., 10–30 minutes) even though the head 20 remains improperly positioned (not shown in FIG. 2). Timing of the duration of the bent neck episode can also be terminated, or continued until the head 20 is returned to an acceptable position.

The infant simulator 10 is used to train persons to properly support the head 20 of a young infant by simply assigning the infant simulator 10 to the person for an assignment period, typically 8 to 72 hours.

When the infant simulator 10 is constructed and programmed to generate a distress signal $S_1$ in response to the sensing of a bent-neck occurrence, the person is provided with immediate feedback as to their performance in supporting the head 20 of the infant simulator 10.

When the infant simulator 10 is constructed and programmed to record bent-neck occurrence data and/or bent-neck-duration data, such data can be reviewed by an educator or other instructor at the end of the assignment period and discussed with the person to whom the infant simulator 10 had been assigned.

The specification is provided to aid in the complete nonlimiting understanding of the invention. Since many variations and embodiments of the invention may be created and devised without departing from the spirit and scope of the invention, the scope of the invention resides in the claims hereinafter appended.

We claim:

1. An infant simulator, comprising:
   (a) a doll having at least a torso and a head connected to the torso by a neck linkage, wherein (i) the head defines a longitudinal primary axis, (ii) the longitudinal primary axis defined by the head defines a longitudinal resting axis relative to the torso when the head is in a central rest position, and (iii) the neck linkage allows gravitational tilting of the head in any direction from the longitudinal Testing axis as between the rest position and a bent position,
   (b) a means effective for sensing positioning of the head in the bent position, and
   (c) at least one of (i) a data recording means in communication with the head-position sensing means effective for recording a sensed positioning of the head in the bent position as bent-neck occurrence data, and (ii) a means in communication with the head-position sensing means for generating a perceptible distress signal when the head is sensed in the bent position.

2. The infant simulator of claim 1 comprising both (i) the data recording means in communication with the head-position sensing means effective for recording a sensed positioning of the head in the bent position as bent-neck occurrence data, and (ii) the means in communication with the head-position sensing means for generating a perceptible distress signal when the head is sensed in the bent position.

3. The infant simulator of claim 2 wherein the perceptible distress signal is generated throughout a distress period.

4. The infant simulator of claim 2 wherein the infant simulator further comprises a data recording means effective for measuring and recording the time period during which the head remains in the bent position as bent-neck duration data.

5. The infant simulator of claim 2 further comprising (i) a means effective for measuring the time period during which the head remains in the bent position, and (ii) a means in communication with the bent-neck duration measuring means and distress signal generating means for escalating the intensity of the distress signal as the duration of the time period during which the head remains in the bent position increases.

6. The infant simulator of claim 1 wherein the doll has a shape and weight of an infant.

7. The infant simulator of claim 2 wherein the doll has a shape and weight of an infant.

8. The infant simulator of claim 2 wherein the perceptible distress signal is expressed as an audible cry.

9. The infant simulator of claim 1 wherein the head is sensed in the bent position when the longitudinal primary axis defined by the head is tilted at least 20° relative to the longitudinal resting axis.

10. The infant simulator of claim 2 wherein the head is sensed in the bent position when the longitudinal primary axis defined by the head is tilted at least 20° relative to the longitudinal resting axis.

11. The infant simulator of claim 2 wherein the head-position data recording means is effective for recording the number of bent-neck occurrences occurring within an assignment period.

12. The infant simulator of claim 2 wherein (i) the head is sensed in the bent position only after the longitudinal primary axis defined by the head is tilted to a predefined angle relative to the longitudinal resting axis, and (ii) the infant simulator further comprises a means for preventing the head from reaching the predefined angle unless the head is tilted at a force exceeding a threshold force for preventing the recording of a bent-neck occurrence and preventing generation of a perceptible distress signal when the head is gently tilted.

13. An infant simulator, comprising (i) a doll having at least a torso and a head connected to the torso by a neck linkage, wherein (a) the head defines a longitudinal primary axis, (b) the head is biased into a rest position relative to the torso by a biasing means, (c) the longitudinal primary axis defined by the head defines a longitudinal resting axis relative to the torso when the head is in the rest position, and (d) the neck linkage allows gravitational tilting of the head in any direction from the longitudinal resting axis as between the rest position and a bent position, (ii) a means effective for sensing positioning of the head in the bent position, and (iii) at least one of (a) a data recording means in communication with the head-position sensing means effective for recording a sensed positioning of the head in the bent position as bent-neck occurrence data, and (b) a means in communication with the head-position sensing means for generating a perceptible distress signal when the head is sensed in the bent position.

14. The infant simulator of claim 13 wherein element (iii) is the data recording means.

15. The infant simulator of claim 13 wherein element (iii) is the means in communication with the head-position sensing means for generating a perceptible distress signal when the head is sensed in the bent position.

16. The infant simulator of claim 13 wherein the infant simulator includes both the data recording means and the means in communication with the head-position sensing means for generating a perceptible distress signal when the head is sensed in the bent position.

17. The infant simulator of claim 15 wherein the perceptible distress signal is generated throughout a distress period.

18. The infant simulator of claim 16 wherein the perceptible distress signal is generated throughout a distress period.

19. The infant simulator of claim 14 wherein the infant simulator further comprises a data recording means effective for measuring and recording the time period ding which the head remains in the bent position as bent-neck duration data.

20. The infant simulator of claim 16 wherein the infant simulator further comprises a data recording means effective for measuring and recording the time period during which the head remains in the bent position as bent-neck duration data.

21. The infant simulator of claim 20 further comprising (i) a means effective for measuring the time period during which the head remains in the bent position, and (ii) a means in communication with the bent-neck duration measuring means and distress signal generating means for escalating the intensity of the distress signal as the duration of the time period during which the head remains in the bent position increases.

22. The infant simulator of claim 13 wherein the doll has a shape and weight of an infant.

23. The infant simulator of claim 14 wherein the doll has a shape and weight of an infant.

24. The infant simulator of claim 15 wherein the doll has a shape and weight of an infant.

25. The infant simulator of claim 16 wherein the doll has a shape and weight of an infant.

26. The infant simulator of claim 15 wherein the perceptible distress signal is expressed as an audible cry.

27. The infant simulator of claim 16 wherein the perceptible distress signal is expressed as an audible cry.

28. The infant simulator of claim 13 wherein the biasing means is effective for maintaining the head in the rest position so long as the longitudinal primary axis defined by the head is tilted less than 45° from vertical.

29. The infant simulator of claim 14 wherein the biasing means is effective for maintaining the head in the rest position so long as the longitudinal primary axis defined by the head is tilted less than 45° from vertical.

30. The infant simulator of claim 15 wherein the biasing means is effective for maintaining the head in the rest position so long as the longitudinal primary axis defined by the head is tilted less than 45° from vertical.

31. The infant simulator of claim 16 wherein the biasing means is effective for maintaining the head in the rest position so long as the longitudinal primary axis defined by the head is tilted less than 45° from vertical.

32. The infant simulator of claim 14 wherein the head is sensed in the bent position when the longitudinal primary axis defined by the head is tilted at least 20° relative to the longitudinal resting axis.

33. The infant simulator of claim 15 wherein the head is sensed in the bent position when the longitudinal primary axis defined by the head is tilted at least 20° relative to the longitudinal resting axis.

34. The infant simulator of claim 16 wherein the head is sensed in the bent position when the longitudinal primary axis defined by the head is tilted at least 20° relative to the longitudinal resting axis.

35. The infant simulator of claim 14 wherein the head-position data recording means is effective for recording the number of bent-neck occurrences occurring within an assignment period.

36. The infant simulator of claim 16 wherein the head-position data recording means is effective for recording the number of bent-neck occurrences occurring within an assignment period.

37. The infant simulator of claim 19 wherein the head-position data recording means and bent-neck duration recording means are effective for recording the number of bent-neck occurrences and the total duration of time during which the head remained in the bent position during an assignment period.

38. The infant simulator of claim 20 wherein the head-position data recording means and bent-neck duration recording means are effective for recording the number of bent-neck occurrences and the total duration of time during which the head remained in the bent position during an assignment period.

39. The infant simulator of claim 19 wherein the bent-neck duration recording means is effective for individually recording the time period during which the head remained in the bent position for each bent-neck occurrence.

40. The infant simulator of claim 20 wherein the bent-neck duration recording means is effective for individually recording the time period during which the head remained in the bent position for each bent-neck occurrence.

41. The infant simulator of claim 14 wherein (i) the head is sensed in the bent position only after the longitudinal primary axis defined by the head is tilted to a predefined angle relative to the longitudinal resting axis, and (ii) the infant simulator further comprises a means for preventing the head from reaching the predefined angle unless the head is tilted at a force exceeding a threshold force for preventing the recording of a bent-neck occurrence when the head is gently tilted.

42. The infant simulator of claim 15 wherein (i) the head is sensed in the bent position only after the longitudinal primary axis defined by the head is tilted to a predefined angle relative to the longitudinal resting axis, and (ii) the infant simulator further comprises a means for preventing the head from reaching the predefined angle unless the head is tilted at a force exceeding a threshold force for preventing generation of a perceptible distress signal when the head is gently tilted.

43. The infant simulator of claim 16 wherein (i) the head is sensed in the bent position only after the longitudinal primary axis defined by the head is tilted to a predefined angle relative to the longitudinal resting axis, and (ii) the infant simulator further comprises a means for preventing the head from reaching the predefined angle unless the head is tilted at a force exceeding a threshold force for preventing the recording of a bent-neck occurrence and prevent generation of a perceptible distress signal when the head is gently tilted.

44. An infant simulator, comprising:
(a) a doll having at least (i) a torso defining a longitudinal axis, (ii) a head, and (iii) a neck linkage connecting the head to the torso, wherein the neck linkage includes at least (A) a longitudinally extending central shaft having an upper end and a lower end, defining a primary longitudinal axis, and fixedly attached to the torso proximate the lower end of the central shaft, (13) a socket fixedly attached to the head, and (C) a ball fixedly attached to the central shaft and pivotally captured within the socket for permitting pivoting of the socket relative to the central shaft as between a longitudinally aligned central rest position and a longitudinally angled position,
(b) a switch attached to the neck linkage wherein the switch is electrically open when the socket is in the central rest position and electrically closed when the socket is in a longitudinally angled position, and
(c) at least one of (i) a data recording means in electrical communication with the switch for recording an electrical closing of the switch as bent-neck occurrence data, and (ii) a sound generating means in electrical communication with the switch for generating a perceptible distress signal when the switch is electrically closed.

45. The infant simulator of claim 44 comprising both (i) the data recording means in electrical communication with the switch for recording an electrical closing of the switch as bent-neck occurrence data, and (ii) the sound generating means in electrical communication with the switch for generating a perceptible distress signal when the switch is electrically closed.

46. The infant simulator of claim 45 wherein the perceptible distress signal is generated throughout a distress period.

47. The infant simulator of claim 45 wherein the infant simulator further comprises a data recording means effective for measuring and recording the time period during which the switch remains closed.

48. The infant simulator of claim 45 further comprising (i) a means effective for measuring the time period during which the switch remains closed, and (ii) a means in communication with the switch and the distress signal generating means for escalating the intensity of the distress signal as the duration of the time period during which the switch remains closed increases.

49. The infant simulator of claim 44 wherein the doll has a shape and weight of an infant.

50. The int simulator of claim 45 wherein the doll has a shape and weight of an infant.

51. The infant simulator of claim 45 wherein the perceptible distress signal is expressed as an audible cry.

52. The infant simulator of claim 44 wherein the switch is electrically open until the socket is longitudinally angled at least 20° relative to the longitudinal resting axis.

53. The infant simulator of claim 45 wherein the switch is electrically open until the socket is longitudinally angled at least 20° relative to the longitudinal resting axis.

54. An infant simulator, comprising a doll having at least a torso defining a longitudinal axis and a head connected to the torso by a neck linkage, wherein the neck linkage includes at least (a) a longitudinally extending central shaft having an upper end and a lower end, defining a primary longitudinal axis, and fixedly attached to the torso proximate the lower end of the central shaft, (b) a socket fixedly attached to the head, (c) a ball fixedly attached to the central shaft and pivotally captured within the socket for permitting pivoting of the socket relative to the central shaft as between a longitudinally aligned central rest position and a longitudinally angled position, and (d) a spring coaxially positioned around the central shaft and captured between the socket and the upper end of the central shaft, whereby the spring biases the socket into the longitudinally aligned central rest position.

55. The infant simulator of claim 54 further comprising (i) a switch attached to the neck linkage wherein the switch is electrically open when the socket is in the central rest position and electrically closed when the socket is in a longitudinally angled position, and (ii) a data recording means in electrical communication with the switch for recording an electrical closing of the switch as bent-neck occurrence data.

56. The infant simulator of claim 54 further comprising (i) a switch attached to the neck linkage wherein the switch is electrically open when the socket is in the central rest position and electrically closed when the socket is in a longitudinally angled position, and (ii) a sound generating means in electrical communication with the switch for generating a perceptible distress signal when the switch is electrically closed.

57. The infant simulator of claim 55 further comprising a sound generating means in electrical communication with the switch for generating a perceptible distress signal when the switch is electrically closed.

58. The infant simulator of claim 56 wherein the perceptible distress signal is generated throughout a distress period.

59. The infant simulator of claim 57 wherein the perceptible distress signal is generated throughout a distress period.

60. The infant simulator of claim 55 wherein the infant simulator further comprises a data recording means effective for measuring and recording the time period during which the switch remains closed.

61. The infant simulator of claim 57 wherein the infant simulator further comprises a data recording means effective for measuring and recording the time period during which the switch remains closed.

62. The infant simulator of claim 56 further comprising (i) a means effective for measuring the time period dung which the switch remains closed, and (ii) a means in communication with the switch and the distress signal generating means for escalating the intensity of the distress signal as the duration of the time period during which the switch remains closed increases.

63. The infant simulator of claim 57 further comprising (i) a means effective for measuring the time period during which the switch remains closed, and (ii) a means in communication with the switch and the distress signal generating means for escalating the intensity of the distress signal as the duration of the time period during which the switch remains closed increases.

64. The infant simulator of claim 54 wherein the doll has a shape and weight of an infant.

65. The infant simulator of claim 55 wherein the doll has a shape and weight of an infant.

66. The infant simulator of claim 56 wherein the doll has a shape and weight of an infant.

67. The infant simulator of claim 57 wherein the doll has a shape and weight of an infant.

68. The infant simulator of claim 56 wherein the perceptible distress signal is expressed as an audible cry.

69. The infant simulator of claim 57 wherein the perceptible distress signal is expressed as an audible cry.

70. The infant simulator of claim 54 wherein the spring is effective for maintaining the socket in the longitudinally aligned central rest position so long as the primary longitudinal axis defined by the central shaft is tilted less than 45° from vertical.

71. The infant simulator of claim 55 wherein the spring is effective for maintaining the socket in the longitudinally aligned central rest position so long as the primary longitudinal axis defined by the central shaft is tilted less than 45° from vertical.

72. The infant simulator of claim 56 wherein the spring is effective for maintaining the socket in the longitudinally aligned central rest position so long as the primary longitudinal axis defined by the central shaft is tilted less than 45° from vertical.

73. The infant simulator of claim 57 wherein the spring is effective for maintaining the socket in the longitudinally aligned central rest position so long as the primary longitudinal axis defined by the central shaft is tilted less than 45° from vertical.

74. The infant simulator of claim 55 wherein the switch is electrically open until the socket is longitudinally angled at least 20° relative to the longitudinal resting axis.

75. The infant simulator of claim 56 wherein the switch is electrically open until the socket is longitudinally angled at least 20° relative to the longitudinal resting axis.

76. The infant simulator of claim 57 wherein the switch is electrically open until the socket is longitudinally angled at least 20° relative to the longitudinal resting axis.

77. The infant simulator of claim 55 wherein the data recording means is effective for recording the number of times the switch is closed within an assignment period.

78. The infant simulator of claim 57 wherein the data recording means is effective for recording the number of times the switch is closed within an assignment period.

79. The infant simulator of claim 54 wherein the infant simulator further comprises a fitting slidably engaging the central shaft between the socket and the spring for longitudinal movement along the longitudinal length of the central shaft, wherein (i) the fitting is biased by the spring towards the socket, and (ii) the fitting includes a transversely extending annular flange with an upwardly beveled lower surface.

80. The infant simulator of claim 55 wherein the infant simulator further comprises a fitting slidably engaging the central shaft between the socket and the spring for longitudinal movement along the longitudinal length of the central shaft, wherein (i) the fitting is biased by the spring towards the socket, and (ii) the fitting includes a transversely extending annular flange with an upwardly beveled lower surface.

81. The infant simulator of claim 56 wherein the infant simulator further comprises a fitting slidably engaging the central shaft between the socket and the spring for longitudinal movement along the longitudinal length of the central shaft, wherein (i) the fitting is biased by the spring towards the socket, and (ii) the fitting includes a transversely extending annular flange with an upwardly beveled lower surface.

* * * * *

UNITED STATES PATENT AND TRADEMARK OFFICE
CERTIFICATE OF CORRECTION

PATENT NO. : 6,997,718 B1
DATED : December 20, 2005
INVENTOR(S) : Bruno M. LaFontaine It is certified that error appears in the above-identified patent and that said Letters Patent is hereby corrected as shown below:

Column 2,
Line 60, replace "second pattering of" with -- second patterning of --.

Signed and Sealed this

Fourteenth Day of February, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,997,718 B1 |
| APPLICATION NO. | : 10/464088 |
| DATED | : February 14, 2006 |
| INVENTOR(S) | : Timmothy Allen Boettcher et al. |

It is certified that error appears in the above-identified patent and that said Letters Patent is hereby corrected as shown below:

This certificate supersedes certificate of correction issued February 14, 2006, the number was erroneously mentioned and should be vacated since no certificate of correction was granted for this patent number.

Signed and Sealed this

Eighteenth Day of July, 2006

JON W. DUDAS
*Director of the United States Patent and Trademark Office*

UNITED STATES PATENT AND TRADEMARK OFFICE
CERTIFICATE OF CORRECTION

PATENT NO. : 6,997,718 B1
APPLICATION NO. : 10/464088
DATED : February 14, 2006
INVENTOR(S) : Boettcher et al.

It is certified that error appears in the above-identified patent and that said Letters Patent is hereby corrected as shown below:

Column 16 Line 3: "Testing" should be --resting--
Column 17 Line 32: "ding" should be --during--
Column 19 Line 58: "int" should be --infant--
Column 20 Line 51: "dung" should be --during--

Signed and Sealed this

Twenty-fourth Day of November, 2009

David J. Kappos
*Director of the United States Patent and Trademark Office*